(12) United States Patent
Nieuwenhuizen et al.

(10) Patent No.: US 7,405,069 B2
(45) Date of Patent: Jul. 29, 2008

(54) METHOD FOR REMOVING A NITROGEN OXIDE FROM A GAS

(75) Inventors: Peter Jan Nieuwenhuizen, Amersfoort (NL); Marco Johannes Wilhelmus Frank, Groenlo (NL); Gerrald Bargeman, Wageningen (NL)

(73) Assignee: Akzo Nobel N.V., Arnhem (NL)

( * ) Notice: Subject to any disclaimer, the term of this patent is extended or adjusted under 35 U.S.C. 154(b) by 644 days.

(21) Appl. No.: 10/508,970

(22) PCT Filed: Mar. 25, 2003

(86) PCT No.: PCT/EP03/03241

§ 371 (c)(1),
(2), (4) Date: Nov. 15, 2004

(87) PCT Pub. No.: WO03/084645

PCT Pub. Date: Oct. 16, 2003

(65) Prior Publication Data

US 2005/0061149 A1 Mar. 24, 2005

(30) Foreign Application Priority Data

Apr. 8, 2002 (EP) .................................. 02076364

(51) Int. Cl.
*A61L 9/01* (2006.01)
(52) U.S. Cl. ........................................ 435/266; 95/196
(58) Field of Classification Search ................... 95/196; 423/235; 435/266
See application file for complete search history.

(56) References Cited

U.S. PATENT DOCUMENTS 4,126,529 A 11/1978 DeBerry (Continued)

FOREIGN PATENT DOCUMENTS

CA 2130767 A1 2/1996

(Continued)

OTHER PUBLICATIONS

Mallevialle et al., "Mass Transport and Permeate Flux and Fouling," Water Treatment Membrane Processes, pp. 4.7-4.17, 1996.

(Continued)

*Primary Examiner*—Walter D. Griffin
*Assistant Examiner*—Shanta G Doe
(74) *Attorney, Agent, or Firm*—Kenyon & Kenyon LLP (57) ABSTRACT

The invention pertains to a method and an apparatus for removing a nitrogen oxide ($NO_x$) from a gas by bringing the gas into contact with a scrub liquid in a scrubber for converting the nitrogen oxide into molecular nitrogen ($N_2$), wherein the scrub liquid comprises a metal ion chelate and a biomass, after which at least a portion of the scrub liquid is subjected to a membrane separation process for separating at least part of the metal ion chelate, and the biomass and other solidified components, from dissolved components, wherein the membrane separation process comprises:

a) filtering at least a portion of the scrub liquid using a first membrane capable of permeating the metal ion chelate to provide a first retentate liquid comprising the biomass and other solidified components, and a first permeate liquid comprising at least part of the metal ion chelate and dissolved components, and b) nanofiltering the first permeate liquid to give a second retentate liquid comprising the metal ion chelate and a second permeate liquid comprising dissolved components, and c) recycling at least part of the second retentate liquid to the scrubber.

17 Claims, 3 Drawing Sheets

U.S. PATENT DOCUMENTS

| | | | |
|---|---|---|---|
| 4,247,401 A | | 1/1981 | Bloch et al. |
| 4,612,175 A | | 9/1986 | Harkness et al. |
| 4,732,744 A | | 3/1988 | Chang et al. |
| 4,808,385 A | | 2/1989 | Grinstead |
| 4,834,886 A | | 5/1989 | Cadotte |
| 4,910,002 A | * | 3/1990 | Grinstead ................ 423/235 |
| 4,921,683 A | | 5/1990 | Bedell |
| 5,167,834 A | | 12/1992 | Gallup |
| 5,370,849 A | | 12/1994 | Chang |
| 5,476,591 A | | 12/1995 | Green |
| 5,891,408 A | * | 4/1999 | Buisman et al. ............ 423/235 |
| 6,368,566 B1 | * | 4/2002 | Hums et al. ................ 423/210 |
| 6,589,498 B1 | | 7/2003 | Barrere-Tricca et al. |

FOREIGN PATENT DOCUMENTS

| | | |
|---|---|---|
| DE | 28 33 440 A1 | 2/1979 |
| DE | 35 04 157 A | 8/1986 |
| DE | 35 28 971 A1 | 2/1987 |
| DE | 35 31 397 A1 | 3/1987 |
| DE | 35 31 398 A1 | 3/1987 |
| DE | 36 28 402 A1 | 2/1988 |
| DE | 37 04 516 A1 | 8/1988 |
| DE | 43 20 070 A | 12/1994 |
| EP | 0 808 210 B1 | 11/1997 |
| EP | 0 945 408 B | 9/1999 |
| EP | 1 059 111 A1 | 12/2000 |
| JP | A 52-129677 | 10/1977 |
| JP | A 52-133876 | 11/1977 |
| JP | A 53-14678 | 2/1978 |
| JP | A 54-110166 | 8/1979 |
| WO | WO 86/05709 A1 | 10/1986 |
| WO | WO 87/02269 A1 | 4/1987 |
| WO | WO 91/15591 A1 | 10/1991 |
| WO | WO 92/17401 A1 | 10/1992 |
| WO | WO 94/28464 A1 | 12/1994 |
| WO | WO 96/24434 A1 | 5/1996 |
| WO | WO 96/30299 A1 | 10/1996 |
| WO | WO 00/2646 A1 | 1/2000 |

OTHER PUBLICATIONS

Ho et al., Membrane Handbook, Selected Application, pp. 317-319, 1992.

Schaep et al., "Influence of Ion Size and Charge in Nanoinfiltration," Separation and Purification, vol. 14, pp. 155-162, 1999.

Schaep et al., "Analysis of the salt Retention of Nanofiltration membranes using the Donnan-Steric Partitioning Pore Model," Separation Science and Technology, vol. 34, No. 15, pp. 3009-3030, 1999.

* cited by examiner

METHOD FOR REMOVING A NITROGEN OXIDE FROM A GAS

The invention pertains to a method and an apparatus for removing a nitrogen oxide ($NO_x$) from a gas by bringing the gas into contact with a scrub liquid in a scrubber for converting the nitrogen oxide into molecular nitrogen ($N_2$), wherein the scrub liquid comprises a metal ion chelate and a biomass, after which at least a portion of the scrub liquid is subjected to a membrane separation process for separating at least part of the metal ion chelate, and the biomass and other solidified components, from dissolved components.

A method of this type is known and is described in detail in WO 96/24434. Thus a flue gas is scrubbed with a circulating scrub liquid containing a transition metal chelate such as iron EDTA. The complex formed from NO and transition metal chelate and/or any spent transition metal chelate is regenerated biologically, NO and $NO_2$ being reduced to molecular nitrogen ($N_2$). Contact of gaseous streams comprising NO with solutions of such metal ion chelates, which are biologically regenerated, can thus be a highly effective process for the removal and conversion of noxious NO and $NO_2$ into molecular nitrogen, which can be discharged directly into the environment.

The invention also relates to a method for simultaneously removing sulfur dioxide and nitrogen oxides from a gas, as was described in WO 00/02646. Thus it is known to scrub both sulfur oxides and nitrogen oxides as gaseous components from a gas by causing the gas to rise in a scrubber, the gas being brought into contact with a scrub liquid in the form of a slurry comprising biomass, preferably comprising at least one of bacteria and yeast, transition metal chelate, and a calcium compound suitable for binding sulfur oxides, such as lime or limestone, which rains down from spray bars in the scrubber. While the nitrogen oxides ($NO_x$) are removed and biologically converted into molecular nitrogen as described above, sulfur oxides are removed by reacting them with the calcium compound to form calcium sulfite, which is oxidized further, inside or outside the scrubber, to calcium sulfate, which is separated and land filled or used in construction.

Under certain operating conditions, the aforementioned processes may have severe limitations. Contaminants are introduced into the reaction solution via the gaseous stream and/or via the make-up water added to the system and degradation products built up as a result of oxidation of the metal ion chelate by oxygen present in the process. Contaminants can be inorganic compounds such as hydrochloric and sulfuric acid, which are scrubbed from the gas to yield chloride or sulfate salts, or organic compounds such as those resulting from the degradation of chelates or being scrubbed from the gaseous stream. The contaminants that enter the process via the make-up water can be inorganic salts, such as sodium chloride, and organic compounds, such as humic acids. Inorganic compounds can build up to levels that interfere with the $NO_x$ and $SO_x$ absorption steps, or that inhibit biomass growth and/or metal ion chelate regeneration activity, making the replacement of the reaction solution necessary. Dilution of the metal ion chelate content by water absorption can be troublesome, requiring the addition of more metal ion chelate or evaporative concentration of the scrub liquid or even the replacement of scrub liquid by fresh liquid.

WO 00/02646 describes a method for the removal of the chelate from the process overflow that is discharged to keep the amount of scrub liquid and contaminants at a suitable level. This involves passing the part of the overflow that is to be discharged through a chelate separator in the form of a membrane filter or some other device suitable for this purpose. No further information on the specific nature of the membrane filter was disclosed. However, specific membrane filtration processes are known in the art and are known to be effective for separating organic molecules and monovalent ions. For instance, in J. Schaep et al., *Separation and Purification Technology*, 14 (1998), 155-162, nanofiltration membranes were used and found to have low retention of chloride ions (magnesium and sodium chloride), but much higher retention of divalent anions. The low retention of halogenide ions enables the separation of halogenide ions from metal ion chelates. An important problem with such membrane process is encountered when the feed comprises biomass, which is necessary for the removal of $NO_x$, because severe membrane fouling can occur. This membrane fouling may result in a lower throughput of permeate through the membrane, which is undesirable. Moreover, when $SO_x$ is removed simultaneously with $NO_x$, the separation efficiency is further hampered by the scaling from saturated or supersaturated solutions of calcium sulfate, calcium sulfite, and/or fines derived therefrom. Thus the use of nanofiltration in separating metal ion chelates from contaminants of biomass-containing scrub liquids as used for the removal of $NO_x$ and $SO_x$ is practically limited or impossible due to fouling by the biomass as well as the precipitation and/or scaling of solidified compounds of, for example, calcium carbonate, calcium sulfate, calcium sulfite, magnesium sulfate, and silica.

Standard solutions for preventing scaling are known from, for instance, the reference works *Membrane Handbook* (edited by Ho and Sirkar, 1992) and *Water Treatment Membrane Processes* (edited by Mallevialle et al., 1996) and include the addition of auxiliary compounds such as acids, water softening agents, complexing agents or anti-scaling agents. These standard methods are often insufficient to fully prevent scaling and more importantly, their application in scrub liquids for the removal of $NO_x$ is disadvantageous. First, the addition of an auxiliary agent such as a softening agent further increases the purification costs, and secondly the presence of these agents can impair the removal of gaseous components from the gas or the biological transformation of $NO_x$ into molecular nitrogen. It can also hinder the regeneration of the metal ion chelate, which may lead to additional purification problems when the auxiliary agent must be removed.

A need thus continues for means to control the concentration of a metal ion chelate in a scrub liquid used in a cyclic process for $NO_x$-removal from gaseous streams, wherein commonly accepted metal ion chelates such as NTA, DTPA, EDTA, and/or HEDTA are employed. Furthermore, a need exists for means to control the build-up of undesirable compounds in the scrub liquid, such as chelate degradation products, inorganic salts, and low-molecular weight organic contaminants. This need is critical in applications where $NO_x$ and $SO_x$ are scrubbed from a gas also containing high concentrations of hydrochloric acid, such as may be the case in power plants that are fueled by coal having a high chloride content, in order to control the chloride level in the scrub liquid, which affects the viability of the biomass. This invention offers a solution to one or more of the above problems.

To this end a method is provided for removing a nitrogen oxide ($NO_x$) from a gas by bringing the gas into contact with a scrub liquid in a scrubber for converting the nitrogen oxide into molecular nitrogen ($N_2$), wherein the scrub liquid comprises a metal ion chelate and a biomass, after which at least a portion of the scrub liquid is subjected to a membrane separation process for separating at least part of the metal ion chelate, and the biomass and other solidified components, from dissolved components, wherein the membrane separation process comprises:

a) filtering at least a portion of the scrub liquid using a first membrane capable of permeating the metal ion chelate to provide a first retentate liquid comprising the biomass and other solidified components, and a first permeate liquid comprising at least part of the metal ion chelate and dissolved components, followed by b) nanofiltering the first permeate liquid to give a second retentate liquid comprising the metal ion chelate and a second permeate liquid comprising dissolved components, followed by c) recycling at least part of the second retentate liquid to the scrubber.

Preferably, a method is provided for removing a nitrogen oxide ($NO_x$) from a gas by bringing the gas into contact with a scrub liquid in a scrubber for converting the nitrogen oxide into molecular nitrogen ($N_2$), wherein the scrub liquid comprises a metal ion chelate and a biomass, after which at least a portion of the scrub liquid is subjected to a membrane separation process for separating at least part of the metal ion chelate, and the biomass and other solidified components, from dissolved components, wherein the membrane separation process comprises:

a) filtering at least a portion of the scrub liquid using a first membrane capable of permeating compounds having a molecular weight of 1,000 Dalton to provide a first retentate liquid comprising the biomass and other solidified components, and a first permeate liquid comprising at least part of the metal ion chelate and dissolved components, and b) nanofiltering the first permeate liquid to give a second retentate liquid comprising the metal ion chelate and a second permeate liquid comprising dissolved components, and c) recycling at least part of the second retentate liquid to the scrubber.

The method of the invention is very suitable for removing $NO_x$ from gas wherein the gas further comprises at least one of a sulfur oxide ($SO_x$), which is converted into at least one of a sulfite or sulfate salt, and where the scrub liquid further comprises an agent for binding with the sulfur oxide, and wherein solidified sulfite and/or sulfate salts are separated from the scrub liquid.

The method of the invention reduces the scaling of either of the membranes used in the method, thus increasing the lifetime of the membrane in question and maintaining a high passage rate as regards the salts to be permeated. The method further prevents biomass from plugging the nanofiltration membrane, thereby maintaining a higher throughput of permeates through the membrane as compared to conventional one-step processes.

In the context of this application, the term "solidified" refers to the presence of solid particles within a liquid. The term "dissolved" refers to a solution which may be supersaturated, saturated or non-saturated.

Generally, in the filtration step a) the membrane used may be a microfiltration, ultrafiltration or nanofiltration membrane; preferably it is a microfiltration or an ultrafiltration membrane, and most preferably the membrane is an ultrafiltration membrane. If a nanofiltration membrane is used in step a), this membrane is not the same as the nanofiltration membrane used in step b). The nanofiltration membrane used in step a) is capable of permeating the metal ion chelate, which is not permeated by the nanofiltration membrane used in step b). Preferably, the nanofiltration membrane of step a) is capable of permeating compounds having a molecular weight that is at least 200 Dalton, more preferably at least 300 Dalton, and most preferably at least 500 Dalton higher than that of the compounds permeated by the nanofiltration membrane used in step b). Depending on the operating conditions of the $NO_x$ or $NO_x/SO_x$ removal, the filtration step a) may be preceded by a pre-treatment step aimed at reducing the super- or over-saturation of inorganic salts such as calcium sulfate or sulfite. Such pre-treatment steps can include any common procedure such as using a settling tank, a temperature treatment, the addition of over-saturation-decreasing additives or the addition of water. The addition of water is preferred. In such case the scrub liquid is diluted with an amount of water which is at least equal to the amount of water that is removed by filtering of the scrub liquid using the first membrane minus the amount of water that can be removed without precipitation of the inorganic compounds in the scrub liquid. Also nanofiltration step b) may be preceded by a pre-treatment step aimed at reducing the super- or over-saturation of inorganic salts in the nanofiltration second retentate liquid. Such pre-treatment steps can include the addition of auxiliary components, a temperature treatment, the addition of water, and the like. The addition of water is preferred. In such case the first permeate is diluted with an amount of water which is at least equal to the amount of water that is removed by nanofiltering of the first permeate minus the amount of water that can be removed without precipitation of the inorganic compounds in the first permeate. In the nanofiltration step excess water is removed from the scrub liquid and at the same time a part of the dissolved inorganic salts such as chlorides and dissolved organic contaminants, which otherwise would impair the operations, is removed.

The invention is illustrated by the following figures.

Figure 1:
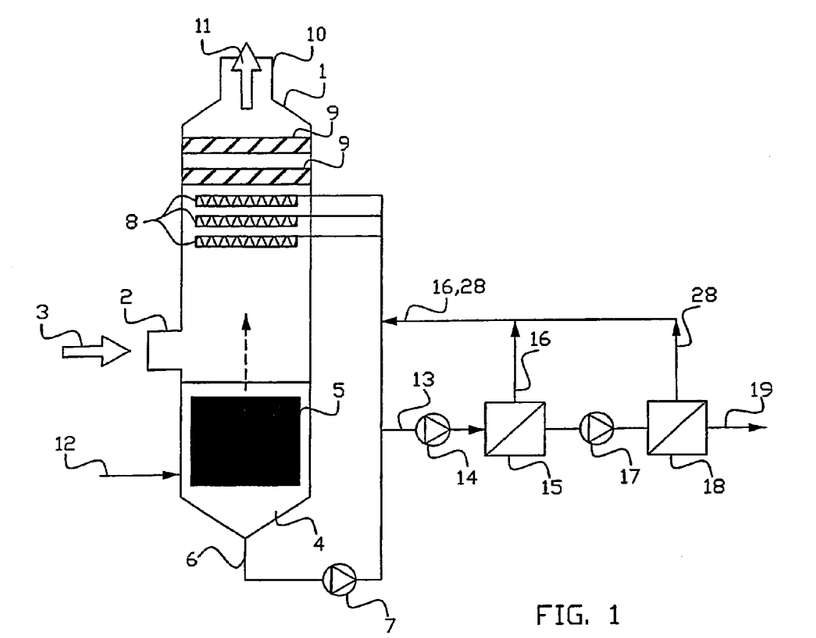
FIG. 1 shows a first embodiment of an apparatus suitable for purifying a gas comprising $NO_x$.

FIG. 1 illustrates a process according to this invention in which nitrogen oxides are removed from a gaseous stream, followed by treatment and recycle of the reaction solution. FIG. 1 depicts a scrubber 1 having a gas inlet 2 for the introduction of the gas to be cleaned into the scrubber 1 in the direction indicated by the arrow 3. In the bottom section 4 of the scrubber 1 a recirculation tank 5 is present with the biomass in the form of free cells, which are regenerated together with the scrub liquid. A recirculation line 6 with a pump 7 is connected to the bottom section 4. The recirculation line 6 is connected to at least one row of spray bars 8. Scrub liquid, which together with the biomass in the recirculation tank 5 is present in the bottom section 4 of the scrubber, is passed by means of the pump 7 through the recirculation line 6 into the spray bars and then falls down in the form of droplets. The dropping droplets which come into contact with gas rising in the scrubber absorb nitrogen oxides. The scrubbed gas passes the spray bars 8 and the optional demisters 9 and leaves the scrubber via a discharge line 10 in the direction indicated by the arrow 11. The scrub liquid is provided with the agents necessary for removing nitrogen oxides, such as iron chelate. For the purpose of replenishing, the scrubber is provided with a first make-up line 12 for replenishing chelate, although such a line may also be attached elsewhere in the system.

A portion of the scrub liquid flowing through the recirculation line 6 is drawn off via a draw-off line 13 and is passed by means of pump 14 to an ultrafiltration unit (comprising an ultrafiltration membrane) 15, where suspended biomass is removed to provide a fully clarified first permeate stream. It is also contemplated that the unit 15 may be a microfiltration unit (comprising a microfiltration membrane) or a nanofiltration unit (comprising a nanofiltration membrane capable of permeating the metal ion chelate). A stream enriched in biomass may be returned to the process via a line 16. The clarified stream, containing metal ion chelate and dissolved contaminants, is fed by means of a pump 17 to a nanofiltration unit (comprising the nanofiltration membrane) 18, wherein a portion of the water and low-molecular weight dissolved contaminants are drawn off as a second permeate stream 19 to be discharged or processed further downstream. The second retentate stream from the nanofiltration unit 18 containing the metal ion chelate may be returned into the process via a line 28. The ultrafiltration unit 15 and the nanofiltration unit 18 can both be operated in different modes, such as a single pass, cross-flow, feed and bleed, and the diafiltration modes.

Figure 2:
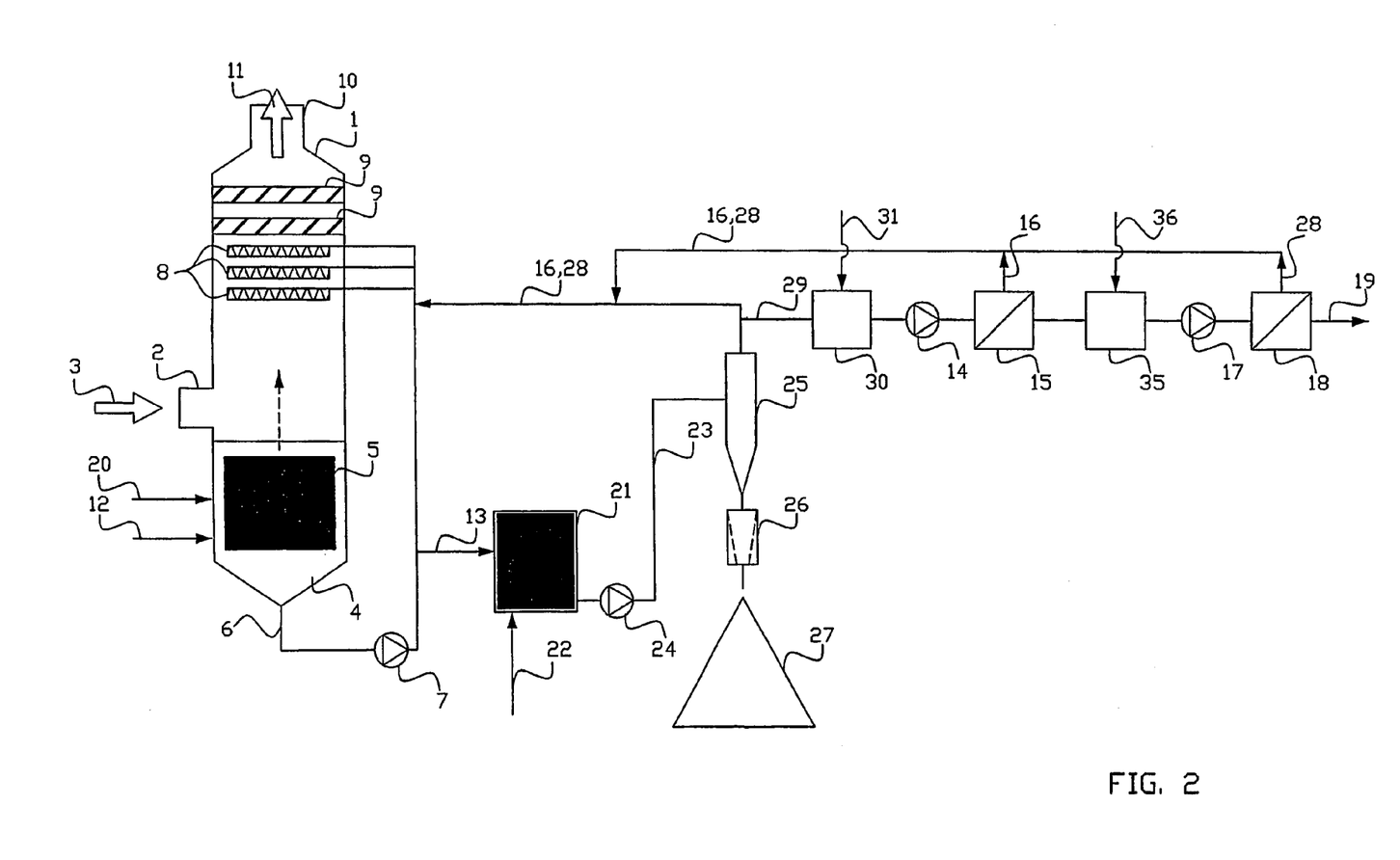
FIG. 2 shows an embodiment of an apparatus suitable for purifying a gas comprising both $NO_x$ and $SO_x$.

FIG. 2 illustrates a process according to this invention in which nitrogen oxides and sulfur oxides are simultaneously removed from a gaseous stream, followed by treatment and recycle of the reaction solution. In FIG. 2, elements with the same reference numerals as in FIG. 1 have the same or analogous functions. The scrub liquid in scrubber 1 is provided with agents for removing both nitrogen oxides, such as a chelate, and sulfur oxides, such as limestone or other $SO_2$ absorbing agents. For the purpose of replenishing agents for removing sulfur oxides, the scrubber 1 is provided with a second make-up line 20.

A portion of the scrub liquid flowing through the recirculation line 6 is drawn off via a draw-off line 13 and is passed to a reactor 21. The reactor 21 is provided with a feed line 22 for supplying it with oxygen, preferably in the form of air. In the reactor 21 the calcium sulfite from the scrub liquid is converted into calcium sulfate by the oxygen supplied. Preferably, this further oxidation is carried out outside the scrubber, to prevent or at least limit oxidation of the metal from the metal ion chelate.

The bottom section 4 of the scrubber where the recirculation tank 5 is provided is used not only as a bioreactor but also as a crystallizer. Calcium sulfite and sulfate formed will, as a result of super-saturation, precipitate as crystals, which will continue to accrete over the residence time. Calcium sulfate together with scrub liquid is passed from the reactor 21 via a transfer line 23, into which a pump 24 is incorporated, to a gypsum dewatering apparatus. This gypsum dewatering apparatus comprises a hydrocyclone 25 and a centrifuge 26. The dried gypsum from the centrifuge 26 is stored in a storage space 27. Other gypsum dewatering installations are also possible.

The overflow of the hydrocyclone 25 is partially recycled via the return lines 28 and 16. Overflow to be discharged is passed via a line 29 to an optional first pre-treatment module 30, which may consist of a settling tank, a thickener, a hydrocyclone, and/or means to perform a temperature treatment or the addition of over-saturation-decreasing additives. Alternatively, the treatment may involve the addition through a line 31 of strong bases such as calcium hydroxide or sodium hydroxide to precipitate metal hydroxides and will supply the chelate in the uncoordinated form to the ultrafiltration unit 15. Preferably, it consists of diluting scrub liquid with water through the line 31. Whatever the nature of the treatment, the first pre-treatment module 30 supplies a scrub liquid which is no longer super-saturated in calcium sulfate and/or sulfite to the ultrafiltration unit 15. In the pre-treatment step monovalent cations, such as sodium or potassium ions, may be added to the feed solution to further improve the separation, in particular to lower chloride retention in the nanofiltration step. Pump 14 provides the no longer super-saturated scrub liquid to an ultrafiltration membrane in unit 15, where suspended biomass and remaining inorganic insoluble salts are removed to provide a fully clarified first permeate liquid stream. A stream enriched in biomass may be returned to the process via the line 16. The clarified stream, containing metal ion chelate and dissolved contaminants, is optionally fed to a second pre-treatment module 35. Although this stream generally does not contain solidified contaminants, these contaminants may become more concentrated in the stream while exposed to the nanofiltration unit 18. This increase in contaminant concentration may result in the formation of solid particles in the liquid or on the membrane surface, which may give rise to scaling problems in the nanofiltration unit 18. This second pre-treatment module can comprise means to perform a temperature treatment, means for adding over-saturation-decreasing additives, or means to provide water. Preferably, the module 35 comprises means for diluting scrub liquid with water, for example through the line 36. Whatever the nature of the treatment, the second pre-treatment module 35 supplies a scrub liquid which is no longer super-saturated in calcium sulfate and/or sulfite and/or other compounds which are liable to cause scaling. The pre-treated liquid is subsequently fed, by means of a pump 17, to a nanofiltration membrane in the unit 18, wherein a portion of the water and low-molecular weight dissolved contaminants are drawn off as a second permeate stream 19 to be discharged or processed further downstream. The second retentate stream from the nanofiltration unit is returned to the process via the line 28. The overflow of an installation designed for the removal of $SO_x$ not equipped with the membranes according to the invention as described above is usually subjected to a water treatment involving the addition of an alkaline reagent such as sodium hydroxide or calcium hydroxide before it is discharged into the environment, this in order to remove heavy metals and other ingredients that are scrubbed from the flue gases. The resulting precipitate is removed from the aqueous phase in a clarifier, so that the final aqueous stream can be directly discharged. Under certain process conditions it is possible to optimize the total process by modifying the relative positions and functions of the membrane filtration step and the water treatment unit. Useful ways to do so include a) the arrangement of the membrane filtration step to follow the water treatment step, b) the complete substitution of the water treatment step by the membrane filtration step, or c) passing a part of the overflow through the membrane filtration units and another part through the water treatment units, and combining both streams in such a way that the total stream conforms to discharge requirements.

Figure 3:
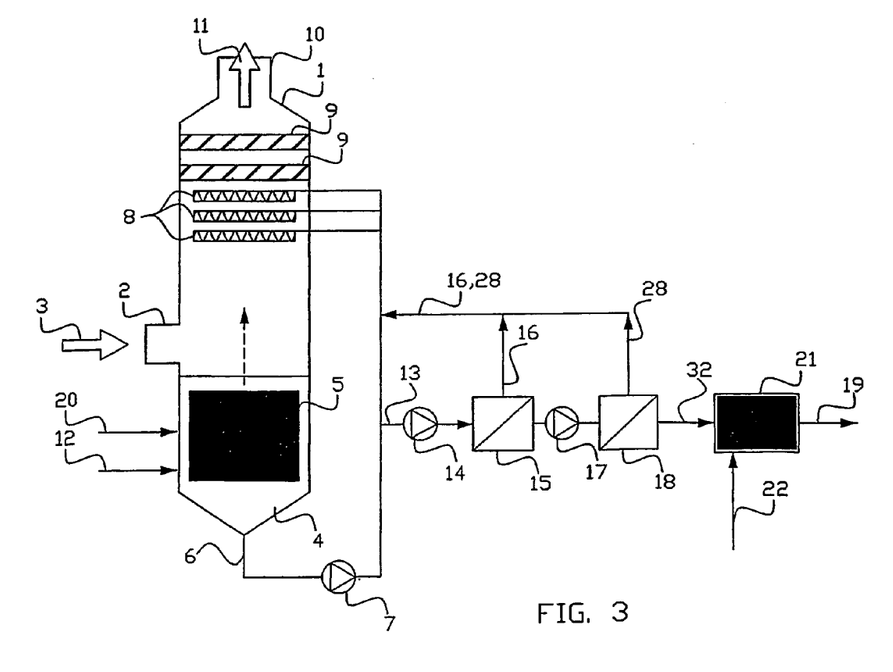
FIG. 3 is another embodiment for purifying a gas comprising both $NO_x$ and $SO_x$.

In FIG. 3 elements with the same reference numerals as in FIG. 1 have the same or analogous functions. In FIG. 3 a sodium-containing compound, preferably aqueous sodium hydroxide, is added to the scrub liquid via a make-up line 20. A portion of the scrub liquid which is recirculated through the line 6 and which contains sodium sulfite, sodium sulfate, and chelate is passed, via the draw-off line 13, optionally to a pre-treatment module 30 (not shown) and to the ultrafiltration unit 15 and optionally to a pre-treatment module 35 (not shown), and via the pump 17 to the nanofiltration unit 18. The biomass and chelate-containing portion of the scrub liquid is recycled to the scrubber 1 via the lines 16, 28. The sodium sulfite and sodium sulfate-containing portion of the scrub-liquid drawn off is passed to a reactor 21 via a line 32. The reactor 21 is supplied with oxygen via the line 22, which converts the sodium sulfite into sodium sulfate. Sodium sulfate-containing and scrub liquid-containing fluid is discharged via the discharge line 19.

Figure 4:
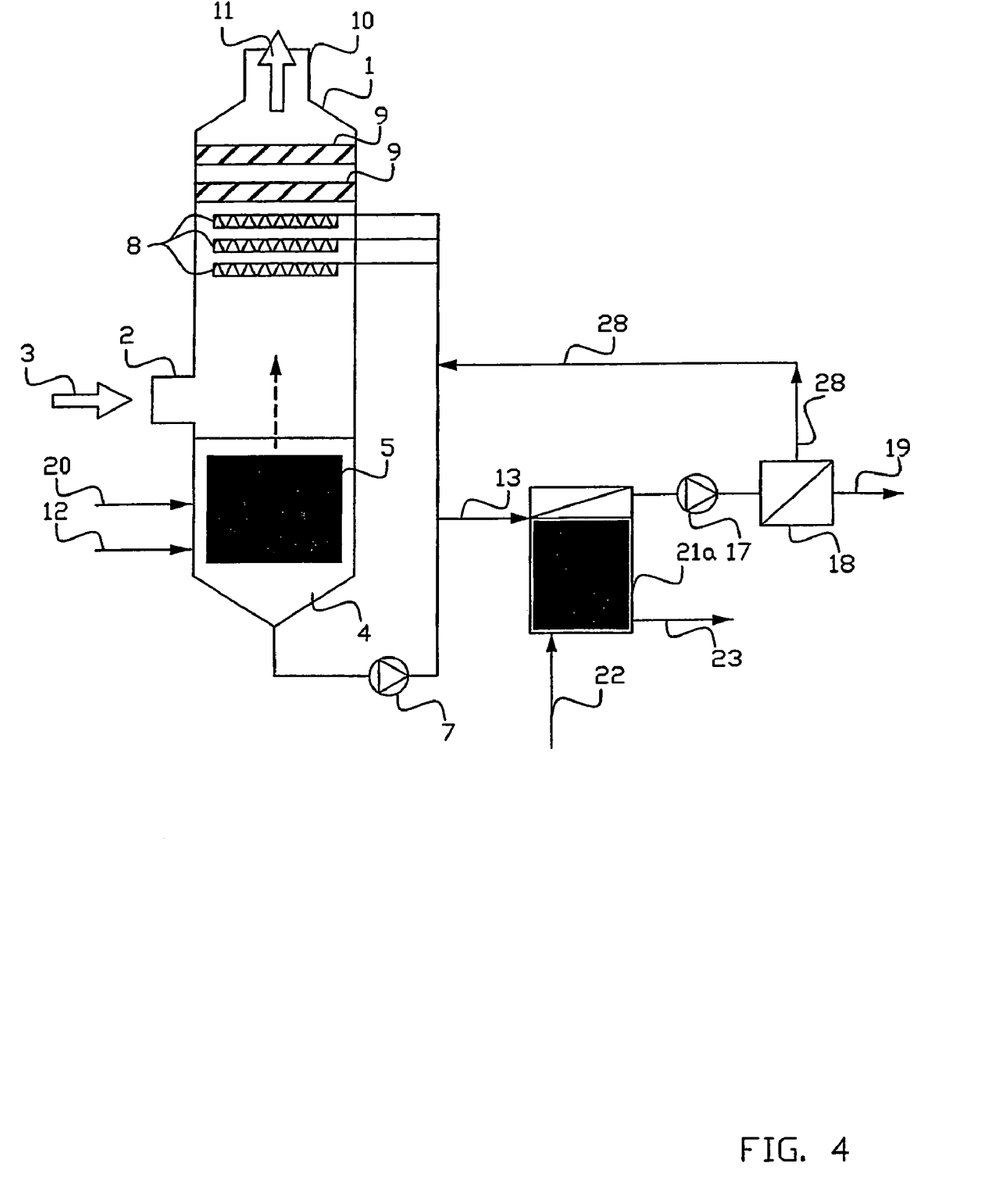
FIG. 4 is a further embodiment for purifying a gas comprising both $NO_x$ and $SO_x$.

A further embodiment of an apparatus according to the invention is shown in FIG. 4. In FIG. 4 elements with the same reference numerals as in FIG. 1 have the same analogous functions. A portion of the scrub liquid is drawn off via the line 13 to a reactor 21a. The reactor 21a only differs from the reactor 21 in FIGS. 2 and 3 in that it further comprises an ultrafiltration membrane. In the reactor calcium sulfate is formed, which causes the liquid to become over-(super)saturated, resulting in the formation of solid particles which descend to the bottom of the reactor 21a. Calcium sulfate together with scrub liquid is passed from the reactor 21a via transfer line 23, into which a pump is incorporated, to a gypsum dewatering apparatus. This apparatus can be an apparatus as shown in FIG. 2 or any other suitable gypsum dewatering installation. The ultrafiltration membrane is generally situated in the scrub liquid, which is commonly known as submerged ultrafiltration. Preferably, it is situated in a part of the liquid which is clear or comprises a relatively small amount of solid particles. The permeated liquid, which comprises sulfate, sulfite, and chelate, is passed via the pump 17 to the nanofiltration unit 18. Optionally, the permeated liquid is passed to a pre-treatment module 35 (not shown), which is situated in advance of the nanofiltration unit. The chelate-containing portion of the scrub liquid is recycled to the scrubber 1 via the line 28. The permeated liquid is drawn off via the line 19 and discharged or processed further downstream.

This invention is not limited by the embodiments illustrated and the skilled artisan will recognize that multiple variations of the process are possible. Such variations include the removal of pre-treatment module 30 and/or pre-treatment module 35.

$NO_x$ and/or $SO_x$ are contained in various gaseous streams. Sources include for example oil- and coal-fueled power plants, mineral ore pelletizing plants, catalyst production units, nitric acid plants, and non-ferrous metal smelters. $NO_x$ and $SO_x$ are toxic gases adding to the greenhouse effect and acid rain. Contact of a gaseous stream containing $NO_x$ with an aqueous absorption solution is very effective in the removal of $NO_x$, if the aqueous absorption solution contains a metal ion capable of binding NO, the component in $NO_x$ which is least soluble in water, as well as a biomass capable of transforming water-solubilized nitrogen oxides into molecular nitrogen. A chemical reaction takes place between the metal ion and NO, whereby NO is bound to the dissolved metal ion.

Suitable metal ions for binding NO are ions derived from iron, manganese, and ruthenium. Particularly preferred are ions derived from iron, the higher (i.e. oxidized) valence state being ferric ion and the lower (i.e. reduced) valence state being ferrous ion, the lower state being able to bind NO. Operable concentrations of the metal ion in the scrub liquid will range from several micromoles to 0.5 M. Preferable concentrations will range from 10 to 100 mM. The metal ion is preferably employed in a water-based solution as a coordination compound in which the metal ion is bound to a chelate. A chelate may be defined as a molecule that contains two or more coordinating groups capable of associating with a metal ion to form a coordination compound. The coordination compound that results from the binding of the metal ions by the chelate or chelates may be referred to as a metal ion chelate. Preferred chelates are organic polycarboxylic acids such as citric acid or aminopolycarboxylic acids. Particularly preferred are aminopolycarboxylic acids derived from ammonia, ethylene diamine, propylene diamine, diethylene triamine, or 2-hydroxyalkyl amines. Examples of such chelates which may be advantageously used include nitrilotriacetic acid (NTA), ethylene diamine tetraacetic acid (EDTA), N-hydroxylethyl ethylene diamine-N,N',N'-triacetic acid (HEDTA), diethylene triamine-N,N,N',N'',N''-pentaacetic acid (DTPA), nitrilotripropionic acid, and ethylene diamine tetrapropionic acid. These may be employed as the acids or their salts, particularly their ammonium or alkali salts. Mixtures of these acids or their salts may be used. Mixtures of the aminopoly-carboxylic acid chelates with other chelates such as citric acid or its salts may also be used. As used herein the term chelate also includes mixtures of chelate compounds. Especially preferred as oxidizing polyvalent metal ion chelates are the ferrous ion chelates formed from NTA, EDTA or HEDTA, most preferably ferrous EDTA.

Operable concentrations of chelant may range widely, but are preferably equimolar with the oxidizing polyvalent metal ion. An excess or a deficiency of the chelate may advantageously be employed, e.g., 10 to 40 mole percent excess or deficiency, relative to the metal ion.

Contact of a gaseous stream comprising $SO_x$ with an aqueous absorption solution is also very effective in the removal of $SO_x$, if the aqueous absorption solution contains a calcium compound such as calcium hydroxide and calcium carbonate that will react with the $SO_x$ present in the gas, particularly sulfur dioxide, to produce sulfurous acid in the scrub liquid. The sulfurous acid is converted to calcium sulfite, which in the presence of oxygen will oxidize further to calcium sulfate according to the following reactions (for calcium carbonate being the calcium compound):

$$SO_2 + H_2O \rightarrow H_2SO_3$$

$$H_2SO_3 + CaCO_3 \rightarrow CaSO_3 + CO_2 + H_2O$$

$$CaSO_3 + \tfrac{1}{2}O_2 \rightarrow CaSO_4$$

For $NO_x$ or $NO_x$ and $SO_x$ removal, the aqueous absorption solution containing the metal ion chelate and the biomass and/or the calcium compound is brought into contact with the gaseous stream in a gas-liquid contactor. The preferred choice of gas-liquid contactor type will depend upon the performance requirements for each use. During gas-liquid contact with a gaseous stream $NO_2$ will be absorbed by the scrub liquid, whereas the dissolved metal ion chelate will react with NO to produce a metal ion-NO chelate complex. The metal ion chelate is regenerated biologically by the biomass. In the presence of a calcium compound also sulfur oxides are scrubbed from the gas stream to produce calcium sulfite and/or calcium sulfate.

The scrub liquid comprising the metal ion chelate and the biomass and optionally the solidified and dissolved inorganic salts is separated from the treated gas stream and is drawn into a loop for treatment and recycle. If the scrub liquid is provided with agents for removing $SO_x$, most or all of the scrub liquid is treated to remove suspended calcium sulfate and/or calcium sulfite. This may comprise passing the scrub liquid through a hydrocyclone or, more simply, a thickening vessel such as a settling tank. Filterability of the calcium sulfite/calcium sulfate dispersion will vary depending upon the process conditions. The calcium sulfate and/or calcium sulfite removed as a filter cake by the treatment unit may be sent on for further dewatering and/or processing. In any calcium sulfite/calcium sulfate dispersion obtained through the scrubbing of $SO_x$, some particulate calcium sulfate/sulfite may be incompletely removed by this treatment and may be present in the overflow.

The $SO_x$ reacts with calcium salts in the aqueous phase to produce calcium sulfite, which may be partially converted into calcium sulfate, due to the presence of oxygen in the feed gas. However, it may be necessary or desirable to also oxidize the remaining calcium sulfite to calcium sulfate in the presence of extra oxygen or air. This is preferably done in a separate reaction vessel and not in the scrubber. If calcium sulfite were to be oxidized in the scrubber, the metal ion chelate would consistently be subject to high concentrations of oxygen, leading to inactive oxidized metal ion chelate and necessitating a higher activity, thus increased cost, of the biological regeneration.

A portion of the scrub liquid is drawn off from the process treatment loop and passed through a secondary process treatment loop involving a first membrane unit (e.g. an ultrafiltration, microfiltration or nanofiltration unit capable of permeating the metal ion chelate) and a nanofiltration membrane unit. The filtration step in the first membrane unit may be, but is not necessarily, preceded by a treatment aimed at reducing the super- or over-saturation of inorganic salts such as calcium sulfate or calcium sulfite in the first membrane unit feed stream. Also the nanofiltration step may be, but is not necessarily, preceded by a treatment aimed at removing the super- or over-saturation of inorganic salts in the nanofiltration second retentate stream. This may involve temperature treatment, the addition of auxiliary components or the addition of fresh water, i.e. water not saturated in the inorganic salts causing the super- or over-saturation (for instance of calcium sulfate or calcium sulfite). The first membrane unit is chosen on the basis of its ability to provide a fully clarified filtrate essentially free of suspended biomass and free of calcium sulfite/sulfate fines to the nanofiltration unit. Preferably, the first membrane is an ultrafiltration unit. This ultrafiltration unit may consist of any of several basic porous membrane types made of polysulfone, polyethersulfone, polyvinyldifluoride, polyacrylonitrile, or modified versions such as hydrophilized polysulfone. The molecular weight cut-off of the membranes is in the range of 1,000 Dalton to 1,000,000 Dalton, preferably in the range of 10,000 to 100,000 Dalton, and more preferably in the range of 20,000 to 50,000 Dalton, so long as it meets the basic requirement of providing a biomass-free and fines-free filtrate. The ultrafiltration module can be in the form of a tubular module, a capillary module, a hollow fiber module, a spiral wound module, a plate-and-frame or a (vibrated) disc module. Preferably, the tubular module or the capillary module is used. The filtrate from the ultrafiltration step is to be fully clarified, that is, to be essentially free of all suspended biomass and fines. A fully clarified reaction solution is defined in this case to be a solution with turbidity (NTU) smaller than 50, preferably below 10 and more preferably below 1. All or a portion of this essentially biomass- and fines-free pass liquid is fed to a membrane device containing a nanofiltration membrane effective for removal of water, inorganic salts and low-molecular weight organic solutes from the clarified metal ion chelate solution. Low-molecular weight is defined in this context to be between 150 and 300 g/mol molecular weight and less. Suitable nanofiltration membrane devices may consist of asymmetric phase inversion membranes or thin film composite membranes. Examples of membranes meeting these requirements are disclosed in U.S. Pat. Nos. 4,247,401 and 4,834,886. U.S. Pat. No. 4,247,401 describes porous asymmetric membranes formed from acetylated cellulose modified with covalently bonded dyestuffs. U.S. Pat. No. 4,834,886 describes thin film composite membranes in which the active permselective layer is a cross-linked polyvinyl alcohol. Membrane compositions other than these are also possible: e.g. acetylated cellulose, polyamide, polysulfone, polyethersulfone, sulfonated polyethersulfone, polypiperazine, polypiperazine amide, polypiperazine polyamide, and aromatic polyamide. Particularly advantageous are sulfonated polyethersulfone membranes or polypiperazine amide membranes. The nanofiltration module can be in the form of a tubular module, a capillary module, a plate-and-frame, a (vibrated) disc module or a spiral wound module. Preferably, the spiral wound module is used and it is ideally suited to treatment of feed solutions that have been fully clarified in a preceding filtration step. The nanofiltration membrane device can be operated at hydraulic pressure on the feed side over a wide range, provided the membrane will tolerate the transmembrane pressure. A pressure in the range of 0.35 to 10 Mpa (50 to 1500 psig) is generally advantageous, preferably 0.7 to 7 Mpa (100 to 1000 psig), more preferably 1.4 to 5.5 Mpa (200 to 800 psig). Actual selection of a hydraulic feed pressure will depend upon several factors, including the membrane type, the total solute concentration of the reaction solution being provided as feed to the device, the reaction solution temperature, the membrane permeation rate, and the pressure limitations of the membrane device. The required hydraulic feed pressure is conveniently provided by means of a pressurizing pump, the selection of which is readily made by the skilled person.

The temperature of the feed solution to the membrane device may vary from 0 to 95° C., provided the membrane and associated components are not deleteriously affected. However, the feed temperature is preferably controlled to values between 20 and 50° C.

The nanofiltration membrane device receives the fully clarified metal ion chelate solution and operationally converts it into two exit streams: a concentrate stream selectively enriched in metal ion chelate and a permeate stream depleted in metal ion chelate and containing most of the contaminants. The concentrate stream enriched in metal ion chelate is recycled to the primary process loop. The permeate is either discarded from the process or treated further. Further treatment may include recycle through a second-stage nanofiltration membrane device for additional recovery of metal ion chelate moieties that may have permeated through the initial nanofiltration membrane device. Preferably, a nanofiltration membrane is selected for the initial nanofiltration treatment step that will eliminate the need for such additional treatment of the second permeate from this initial nanofiltration step. The nanofiltration membrane should be capable of permeating water, inorganic salts dissolved therein, and low-molecular weight organic compounds of up to 150 to 300 molecular weight dissolved therein, while effectively concentrating metal ion chelate moieties of 150 to 300 molecular weight or higher.

The metal ion chelate in the process liquids can be in the form a metal chelate coordination compound, such as iron EDTA, or equally in the form of the metal ion chelate not bound to the metal ion.

The method of the invention has the advantage that it is able to remove biomass from scrub liquid and to control the concentration of metal ion chelate together with that of contaminants that can impair the operations, effectively prevents scaling due to the occurrence of over-saturated solutions of calcium sulfite and/or sulfite, and does not require the addition of auxiliary components. The method of the invention is useful when the discharge of metal ion chelate in order to control the concentration of contaminants would negatively affect the cost performance of the process. The method of the invention is particularly useful when the discharge of metal ion chelate is prevented from an environmental point of view. The method further is very suitable for the separation of chelating agents, preferably an aminopolycarboxylic acid such as EDTA, from inorganic salts.

The following examples are presented to illustrate this invention, but are not intended to limit the scope of the invention.

EXAMPLE 1

A recycle solution from a process for the removal of $NO_x$ comprised biomass, sodium ions, sulfate ions, chloride ions, and Fe-EDTA. This solution was fed to a hollow fibre polysulfone ultrafiltration module from KOCH with a MWCO of 500,000 Dalton. At a pressure of 3 bar and at room temperature, 80% of the feed was successfully cleaned of biomass and fines. The clear permeate solutions were transferred to a nanofiltration unit and the concentrate solution was recycled to the scrubber system.

EXAMPLE 2

A recycle solution from a process for the removal of $NO_x$ comprised biomass, sodium ions, sulfate ions, chloride ions, and Fe-EDTA. The solution was fed to a tubular modified polysulfone ultrafiltration module from Stork with a MWCO of 50,000 Dalton. At a pressure of 4 bar and at room temperature, 90% of the feed was successfully cleaned of biomass and fines. The clear permeate was subsequently treated with a spiral wound sulfonated polyethersulfone nanofiltration membrane. At a pressure of 20 bar and at room temperature the Fe-EDTA was successfully separated from the inorganic salts: the Fe-EDTA, sulfate and chloride retentions were 82%, 24%, and −7%, respectively. The concentrate solution, containing most of the Fe-EDTA solute, was recycled to the scrubber process, whereas the salt-containing permeate flow, with a strongly reduced Fe-EDTA concentration, was discharged.

EXAMPLE 3

A recycle solution from a process for the combined removal of $SO_x$ and $NO_x$ comprised suspended solids (calcium sulfite and calcium sulfate), biomass, dissolved sodium, potassium, calcium and magnesium ions, dissolved chloride and sulfate ions, and Fe-EDTA. The solution was fed to a tubular modified polysulfone ultrafiltration module from Stork with a MWCO of 50,000 Dalton. At a pressure of 3 bar and at room temperature the feed was successfully cleaned of biomass and suspended solids. NTU's smaller than 10 were obtained. The clear permeate was subsequently treated with a spiral wound polypiperazine amide nanofiltration membrane. At a pressure of 10 bar and at room temperature the Fe-EDTA was successfully separated from the inorganic monovalent salts: the Fe-EDTA retentions were in the range of 99.0 to 99.8%. The chloride retentions were in the range of −5 to 40%, depending on the composition of the solution. The concentrate solution containing all of the Fe-EDTA was recycled to the process, whereas the monovalent salt-containing permeate flow, with almost no Fe-EDTA, was discharged.

The invention claimed is:

1. A method for removing a nitrogen oxide ($NO_x$) from a gas by bringing the gas into contact with a scrub liquid in a scrubber for converting the nitrogen oxide into molecular nitrogen ($N_2$), wherein the scrub liquid comprises a metal ion chelate and a biomass, after which at least a portion of the scrub liquid is subjected to a membrane separation process for separating at least part of the metal ion chelate, and the biomass and other solidified components, from dissolved components, wherein the membrane separation process comprises:

(a) filtering at least a portion of the scrub liquid using a first membrane capable of permeating the metal ion chelate to provide a first retentate liquid comprising the biomass and other solidified components, and a first permeate liquid comprising at least part of the metal ion chelate and dissolved components, and (b) nanofiltering the first permeate liquid to give a second retentate liquid comprising the metal ion chelate and a second permeate liquid comprising dissolved components, and (c) recycling at least part of the second retentate liquid to the scrubber.

2. The method according to claim 1 wherein the first membrane is a membrane capable of permeating compounds having a molecular weight of 1,000 Dalton.

3. The method according to claim 1 wherein the first membrane is an ultrafiltration membrane.

4. The method according to claim 1 wherein the gas further comprises at least one of a sulfur oxide ($SO_x$), which is converted into at least one of a solidified sulfite or sulfate salt, and the scrub liquid further comprises an agent for binding with the sulfur oxide, and wherein solidified sulfite and/or sulfate salts are separated from the scrub liquid.

5. The method according to claim 4 wherein the first permeate is pre-treated before nanofiltering so as to prevent the solidification of compounds that are liable to cause scaling.

6. The method according to claim 5 wherein the first permeate is diluted with an amount of water which is at least equal to the amount of water that is removed by nanofiltering of the first permeate minus the amount of water that can be removed without precipitation of the inorganic compounds in the first permeate.

7. The method according to claim 4 wherein the scrub liquid is pre-treated before filtering using the first membrane so as to prevent the solidification of compounds that are liable to cause scaling.

8. The method according to claim 7 wherein the scrub liquid is diluted with an amount of water which is at least equal to the amount of water that is removed by filtering of the scrub liquid minus the amount of water that can be removed without precipitation of the inorganic compounds in the scrub liquid.

9. The method according to claim 1 wherein the gas further comprises heavy metals.

10. The method according to claim 1 wherein the conversion of the nitrogen oxide into molecular nitrogen is brought about by the biomass.

11. The method according to claim 4 wherein the agent for binding with the sulfur oxide comprises at least one of calcium and magnesium ions.

12. The method according to claim 1 wherein the dissolved components of the permeate liquid comprise at least one of chloride and sulfate ions.

13. The method according to claim 1 wherein the biomass comprises at least one of bacteria and yeast.

14. The method according to claim 1 wherein the metal ion chelate comprises an aminopolycarboxylic acid and a transition metal ion.

15. The method according to claim 3 wherein the ultrafiltration membrane is selected from polysulfone, polyethersulfone, polyvinyldifluoride, polyacrylonitrile, or modified versions thereof, and the nanofiltering uses a nanofiltration membrane selected from asymmetric phase inversion membranes or thin film composite membranes.

16. The method according to claim 1 wherein monovalent cations are added to the scrub liquid.

17. An apparatus for performing the method of claim 1 comprising a scrubber (1) and a membrane separation unit (15, 18), characterized in that the membrane separation unit (30, 15, 35, 18) comprises, optionally, a first pretreatment module (30), a first filtration compartment (15) comprising a membrane capable of permeating the metal ion chelate, a second pretreatment module (35) and a second nanofiltration compartment (18), means (28) for transporting the retentate liquid obtained in the second nanofiltration compartment (18) to the scrubber (1) and/or means (16) for transporting the retentate liquid obtained in the first filtration compartment (15) to the scrubber (1).

* * * * *